Oct. 4, 1932.  L. W. DROTT  1,880,902

FORCE FEED LUBRICATOR

Filed Sept. 14, 1926  5 Sheets-Sheet 3

Inventor,
Louis W. Drott,

Patented Oct. 4, 1932

1,880,902

UNITED STATES PATENT OFFICE

LOUIS W. DROTT, OF DETROIT, MICHIGAN, ASSIGNOR TO McCORD RADIATOR & MFG. CO., OF DETROIT, MICHIGAN, A CORPORATION OF MAINE

FORCE FEED LUBRICATOR

Application filed September 14, 1926. Serial No. 135,352.

This invention relates to force feed lubricators for suplying lubricating oil under pressure to machinery bearings, cylinders, pistons, and the like.

One object of my invention is to cause the oil to flow from the suction to the delivery side of the pump unit by a partial vacuum created by the delivery plunger on each outward stroke thereof so that the amounts of oil delivered from the unit will be exactly the same as the amount passed through the sight feed on each inward stroke of the primary pump, thus making the unit accurate and efficient in its operation.

Another object of my invention is to connect the stroke shaft of the unit with its operating cam by a yoke which is open at one end so that the yoke may be slid endwise on and off of its cam and be placed in and removed from the reservoir without dismantling either the cam or its shaft or stopping the rotation thereof or interfering with or removing any of the other pump units if the lubricator is of the multiple unit type.

A further object of my invention is to locate the ball checks of the unit remote from the primary and delivery plungers so that the balls can not follow the plungers on their outward strokes and thus fail to seat at the proper time on the inward strokes of said plungers to make an inaccurate lubricator.

A still further object of my invention is to provide the lower side of the unit against oil leakage so that the oil under excess pressures, as caused by clogging up of the delivery line, will be caused to leak through the packings of the plungers to the outside of the unit and visibly indicate the faulty condition of the line so that it may be quickly attended to.

Another object of my invention is to locate the check valve for the suction tube of the unit at the extreme lower end of said tube, so as to be as close as possible to the bottom wall of the reservoir and thus insure immediate starting of oil suction in the operation of the pump.

A further object of my invention is to provide means whereby the stroke of the suction plunger may be varied with respect to the stroke of the delivery plunger and thus allow the later to operate at full stroke at all times for full oil delivery while the stroke of the suction plunger may be adjusted to regulate the amount of oil which may be delivered by the delivery plunger.

A further object of my invention is to provide a structure which may be easily and readily assembled and dismantled without the use of skilled labor or special instruction.

The invention consists further in the matters hereinafter described and claimed.

In the accompanying drawings—

Figure 1:
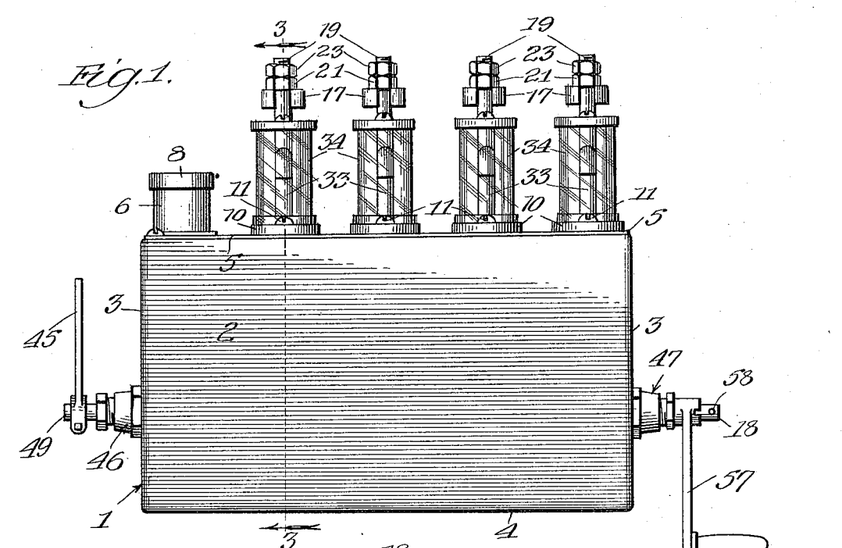
Fig. 1 is a front view of a force feed lubricator embodying the features of my invention.
Figure 5:
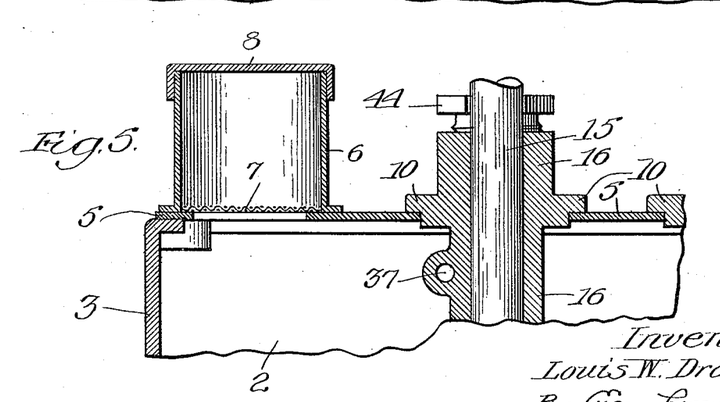
Fig. 5 is a longitudinal vertical view taken on line 5—5 of Fig. 4.

As shown in the drawings, the lubricator has a reservoir 1 preferably in the form of a box-like casting having upright side and end walls 2, 3, and a bottom wall 4, there being a removable cover plate 5 for closing the top of the box. The reservoir 1 is designed to contain a supply of oil, and for refilling purposes has a filler neck 6 on top of the cover plate 5 preferably at one end of the box. The neck 6 contains an oil screen 7, as usual, and has a removable closure cap 8 fitting over its upper end, as shown in Figs. 1 and 5. The filler neck 6 may be located at either end of the reservoir, depending on the requirements of the design.

In Fig. 1, I have shown the reservoir 1 provided with a plurality of pump units so that the oil in the reservoir may be simultaneously and automatically pumped therefrom to a number of different places of lubrication, as bearings, cylinders, etc.

Figure 2:
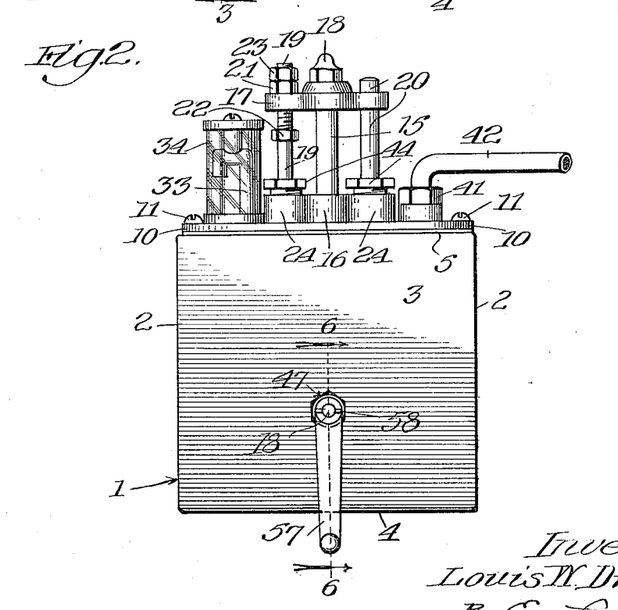
Fig. 2 is an end view of the same.
Figure 4:
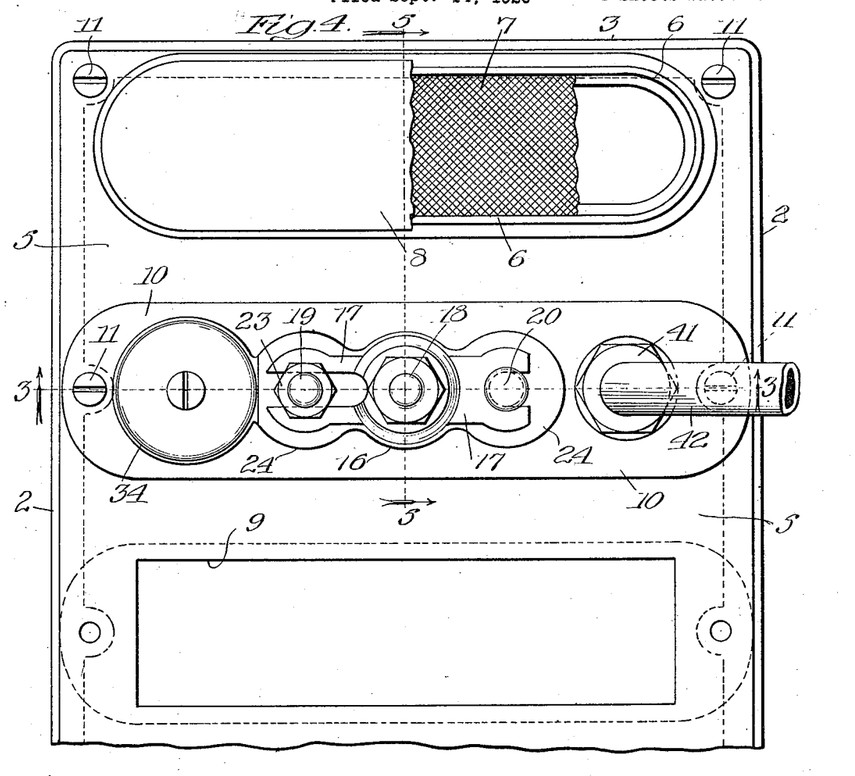
Fig. 4 is an enlarged fragmentary top plan view of the lubricator with one unit removed to show the slot therefor in the cover plate of the reservoir.

The pump units are suspended from the top of the reservoir 1 and arranged to extend across the same in side by side relation between the side walls 2, 2 of the reservoir, as shown in Figs. 2 and 4. The cover plate 5 is provided with a plurality of slots 9 extending part way across the same and disposed to receive the several pump units, as illustrated in Fig. 4.

Figure 3:
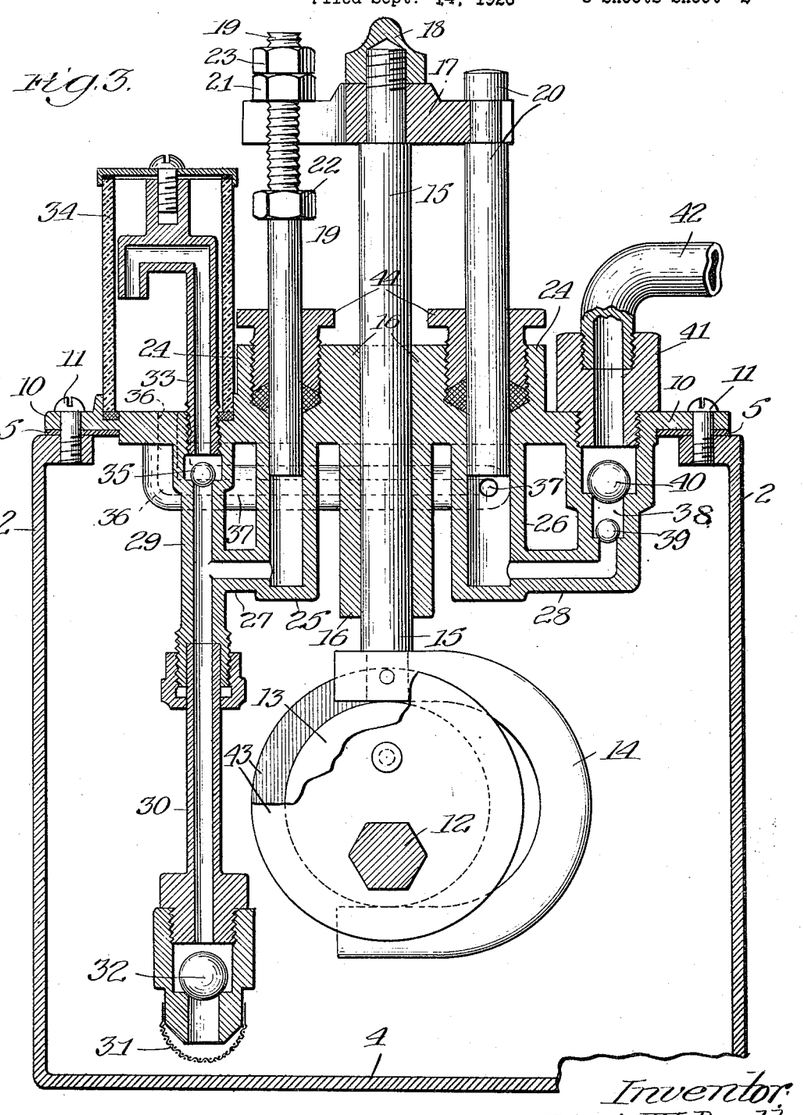
Fig. 3 is an enlarged vertical sectional view through a pump unit on line 3—3 of Figs. 1 and 4.

The several pump units are alike in construction and operation, so a description of one will suffice for all. Each pump unit has a laterally narrow elongated cast or forged body which passes through and fits in its slot 9 in the cover plate 5 to close the slot, said body having a height to extend above and below the cover plate. The body has a substantially flat surrounding flange 10 between its upper and lower ends, said flange seating on the top surface of the cover plate 5 about the slot 9 to suspend or support the unit in place on the reservoir. The flange 10 extends across the top of the cover plate 5 from one side wall 2 of the reservoir to the other and is secured thereto by screws 11, 11, as shown in Figs. 2 and 3. The reservoir 1 has inwardly extending parts at its upper edges to receive these screws, the latter also passing through the portions of the cover plate 5 interposed between the ends of the flange 10 and the reservoir to secure the cover plate on the reservoir.

Horizontally disposed in the reservoir 1 below the several pump units and common to all of them is a shaft 12, preferably hexagonal in cross-section, as shown in Fig. 3. Mounted on said shaft for rotation therewith are a plurality of cams or eccentrics 13, 13 one for each pump unit and disposed directly below the same. For each cam there is a yoke 14 open at one end so that it may readily slip endwise on and off the cam without removing either the cam or the shaft from the reservoir.

Figures 10, 11, 12, 13, 14, 15:
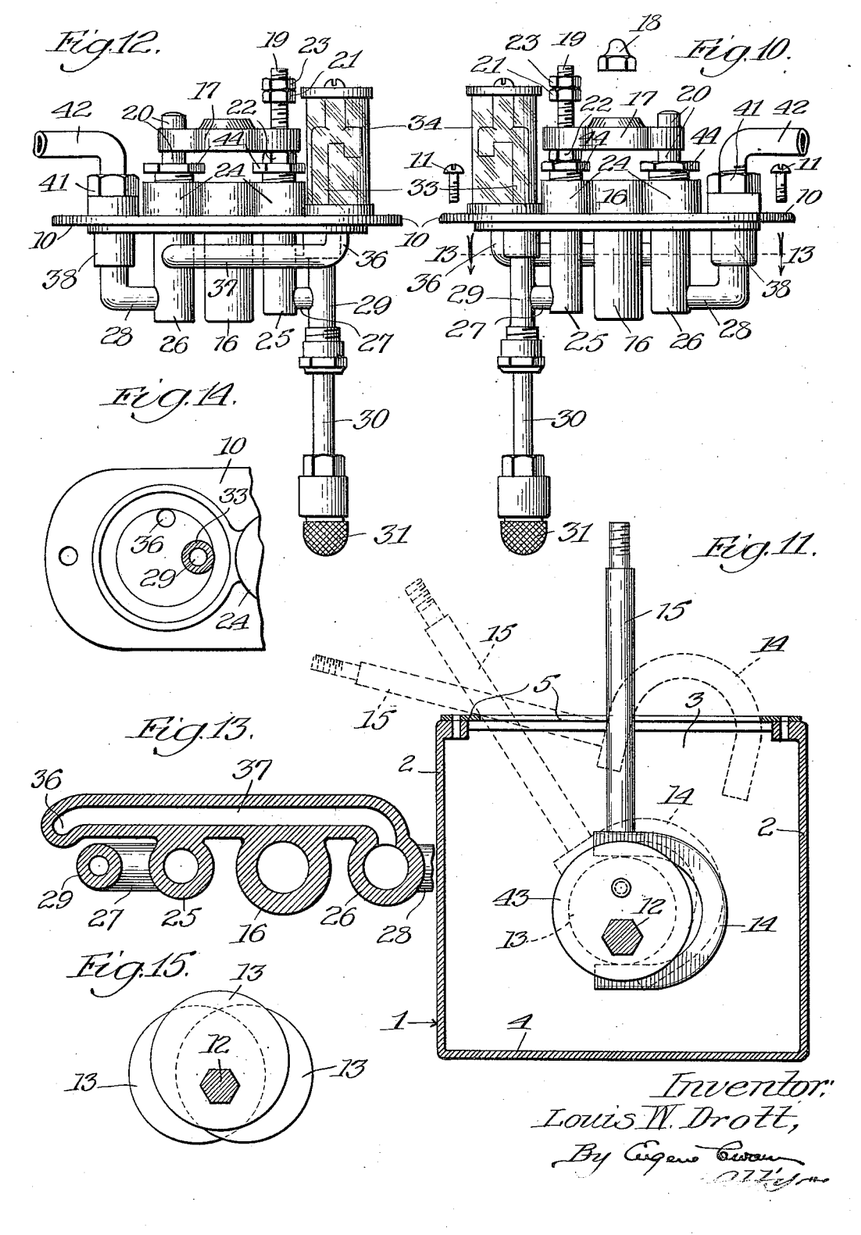
Figs. 10 and 11 show the manner in which a pump unit is removed from its stroke shaft and how the latter is removed from the reservoir.
Fig. 12 is a side view of the unit, opposite to that shown in Fig. 10.
Fig. 13 is an enlarged sectional plan view taken on line 13—13 of Fig. 10.
Fig. 14 is an enlarged plan view of the unit at the seat for the sight feed glass.
Fig. 15 is a view showing how the cams may be set about the cam shaft for operating the pump units in alternation.

The yoke 14 is vertically disposed and has its upper and lower portions bearing against the upper and lower peripheries, respectively, of the cam, so as to be positively raised and lowered in the rotation of the cam. A stroke shaft 15 is secured to and extends upward from the yoke 14 and passes through guide bosses 16, 16 provided in the body of the unit and extending above and below the flange 10 to provide a relatively long bearing on the body for the stroke shaft 15 and thus avoid the necessity and expense of making a bearing for this shaft either in the cover plate 5 or on the bottom wall 4 of the reservoir as heretofore. The upper end of this shaft 15 extends above the uppermost boss 16 and is releasably secured to a horizontal cross-head 17 by a suitable screw cap 18, the upper end of the shaft being reduced and threaded for the purpose, as shown in Figs. 3 and 11.

The cross-head 17 extends on opposite sides of the shaft 15 in a direction parallel to the length of the body and is slotted at its opposite ends, as shown in Figs. 3 and 4. These slots open through the ends of the cross-head 17 and receive the vertically disposed plungers 19, 20 of the pumping elements of the unit. The upper portion of the plunger 19 of the primary pump extends above the cross-head and is threaded along its length to receive nuts 21, 22 on opposite sides of the cross-head, 17, so that the latter may reciprocate the plunger 19 in the up and down movements of the stroke shaft 15. The upper nut 21 is adjustable on the plunger 19 so as to regulate the amount of up and down movement imparted to the plunger 19 by the stroke shaft 15. To hold the nut 21 in its position of adjustment, I provide above the same on the plunger a jam nut 23. The lower nut 22 is fixed on the plunger so as to provide a stop for the cross-head on its downward stroke. The delivery plunger 20 has positive connection with its end of the cross-head 17 by being shouldered on opposite sides of the cross-head so as to be operated at full strokes at all times regardless of the amount of lost motion provided for the stroke of the plunger 19 in the adjustment of the nut 21 on the latter. This, together with the partial vacuum feature to be presently described, makes the plunger 20 deliver on each downward or pressure stroke the full amount of oil drawn from the reservoir 1 on each up or suction stroke of the primary plunger 19.

As shown in Fig. 3, the plungers 19, 20 reciprocate in bosses 24, 24 provided in the body of the unit on the upper side of the flange 10. The bores of these bosses continue downward into pump barrels 25, 26 carried by the body of the unit and extending below the flange 10. The bores of the barrels 25, 26 are closed at their lower ends and have openings just above the same into horizontally disposed conduits 27, 28, one for each barrel and preferably formed integral therewith, as shown. The conduit 27 connects with a vertically arranged conduit 29 extending above and below the same, as shown in Fig. 3. The lower end of the conduit 29 connects with the upper end of a suction tube 30 which extends downward toward the bottom wall 4 of the reservoir 1. At the extreme lower end of this tube 30 is a suction valve assembly embodying a housing having an intake screen 31 forming its lower portion. An inwardly opening gravity check ball 32 is in said housing for the lower end of the suction tube, as shown in Fig. 3. The screen is located closely adjacent the bottom wall 4 of the reservoir so as to be always in the oil supply. By having the valve 32 at the extreme lower or intake end of the suction tube 30, the amount of oil drawn into the tube on each up stroke of the primary plunger 19 will be checked in the tube on passing the valve so as to be available for the delivery plunger, which is not the case when this valve is located high up the tube as heretofore.

The upper end of the conduit 29 communicates with the lower end of a sight feed nozzle 33 extending above the body of the unit and located in sight glass 34, as shown in the drawings. Said glass seats on a suitable gasket set in the body of the unit within a boss projecting slightly above the flange 10. The upper end of the glass is closed by a cap which is secured to the upper end of the nozzle by a screw. As shown, said screw when tightened clamps the glass against the gasket and makes a leak proof chamber for the oil pumped therethrough. (See Fig. 3.) There is a gravity closing ball check 35 at the upper end of the conduit 29 to prevent a return flow from the nozzle in the operation of the device.

On each upstroke of the plunger 19 oil is drawn into the barrel 25 of said plunger from the reservoir 1 through the conduits 30 and 29 and forced into the sight glass chamber 34 through the nozzle 33 on each down stroke of said plunger, the check valves 32 and 35 reversely opening and closing in the up and down movements of the plunger.

The body of the unit has an oil outlet passage 36 which is connected with the barrel 26 of the delivery plunger 20 by a conduit 37, as shown in Figs. 3, 13, and 14. Conduit 28 opens at one end into the barrel 26 adjacent the closed lower end thereof, while the other end of said conduit 28 opens into the lower end of a delivery chamber 38, which is provided with a pair of superimposed gravity closing check balls 39, 40 immediately above the connection of this chamber with conduit 28. Conduit 37 opens into barrel 26 at a point high enough above the closed lower end of the barrel so as not to be uncovered by the plunger 20 until the latter reaches the limit of its upper stroke, as shown in Fig. 3.

By this arrangement, plunger 20 closes the adjacent end of conduit 37 to barrel 26 during the major portion of the up stroke of the plunger, thereby allowing the same to create a partial vacuum below it in the barrel during this up stroke and effecting the closing of the check balls 39, 40. As soon as the plunger 20 uncovers the conduit 37, the vacuum is released and the oil will be quickly sucked into the barrel 26 from sight glass chamber 34 through passages 36 and 37. This action is very rapid and all of the oil delivered to the sight glass chamber 34 on each down stroke of the primary plunger 19 will be quickly discharged into the barrel 26 on each up stroke of the delivery plunger 20. Thus no oil remains in the sight glass to build up and flood the same as heretofore, thereby avoiding the use of overflows for the sight glass chamber. Moreover, the amount of oil forced out of the delivery chamber 38 on each down stroke of the delivery plunger 20 is exactly the same as the amount previously supplied to the sight glass chamber 34 on the corresponding stroke of the primary plunger 19. This insures a delivery from the lubricator at all times of the same amounts of oil as fed through the sight glass. With the stroke of the primary plunger 19 adjustable, the lubricator may be set to feed one or more drops of oil or a fraction of a drop to the sight glass and deliver exactly the same amounts from the delivery chamber, thereby making the lubricator accurate in that it will deliver to the places for lubrication the same amounts of oil as fed through the sight glass. This is an important feature of my invention because the engineer in setting the stroke of the primary plunger 19 for one or more drops of oil or a fraction of a drop or a continuous stream per stroke of the primary plunger, as the conditions may require, and, seeing such amounts of oil going through the sight glass chamber, knows that such amounts of oil, no more and no less, are being delivered to the places of lubrication. This makes the device accurate and efficient in its operation and insures an automatic and constant proper lubrication of the parts fed by the device. The delivery chamber 38 leads to a discharge connection 41 to which is secured a suitable pipe fitting 42, which may be straight or an elbow so that the lubricator may be connected to the conduits of the oil line.

The pump unit may be readily and easily removed from the reservoir 1 by taking out the screws 11, 11 from the ends of the flange 10 and taking off the cap nut 18 from the upper end of the stroke shaft 15. The body of the unit and its attached parts may be raised out of the reservoir 1 through the slot 9 in the cover plate 5, as shown in Figs. 10 and 11. This leaves the stroke shaft 15 and yoke 14 connected with the shaft 12. With the yoke 14 open at one end, it may be removed from the cam 13 by canting the shaft 15 to an angle with its upper end at or near the upper edge of the reservoir at the side opposite the yoke, as indicated in dotted lines in Fig. 11. When in this position, the yoke may be swung upward from the cam through the medium of the shaft and be taken out of the top of the reservoir 1 through the slot 9 in the cover, as shown in dotted lines in Fig. 11. This is also an important feature of my invention because it enables the pump unit and stroke shaft with its yoke to be readily and easily removed from the reservoir without dismantling the shaft 12 or taking off the cam or disturbing the operation of the other pump units or their connection with the reservoir or the shaft 12, if the device is of the multiple unit type. Each unit has a stroke shaft 15, thereby avoiding the necessity of having a stroke shaft connected with the operating plungers of two adjacent units, as heretofore. Thus each unit may be removed from the reservoir for inspection or repair or such other attention as it may require, without putting out of operation the adjacent unit, as when a stroke shaft is connected with two adjacent units as heretofore.

Figure 6:
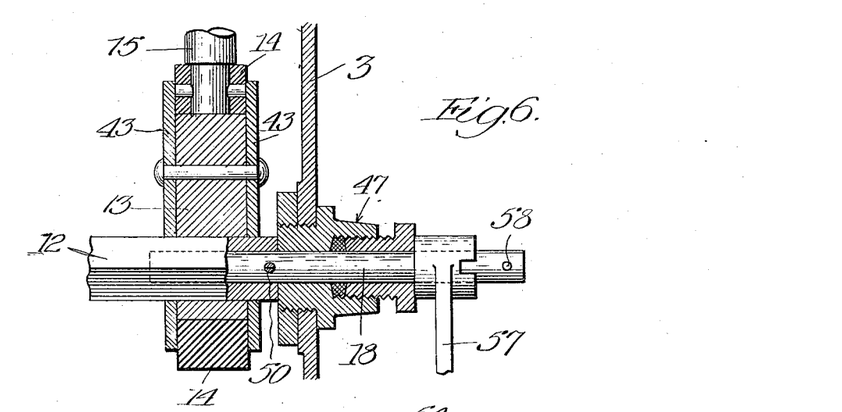
Fig. 6 is an enlarged vertical sectional view taken through one end of the cam shaft on line 6—6 of Fig. 2.

To prevent the yoke 14 from sliding or working sidewise off of its cam 13, I provide discs 43, 43 on opposite sides of the cam and pinned thereto, as shown in Figs. 3 and 6. These discs overlap the upper and lower portions of the yoke on opposite sides thereof and revolve with the cam. In removing the yoke from the cam, the yoke is withdrawn from between the discs, the latter remaining on the cam to provide a retaining channel for the yoke on its replacement.

The plungers 19, 20 are packed in their respective bosses 24, 24, as shown in Fig. 3. The plungers extend through the packings and the nuts 44, 44 used therewith. By reason of this construction, the oil will leak up past the packing nuts 44, 44 under excess pressures such as produced when the oil lines on the delivery side of the device are clogged by dirt or other foreign matter. Thus oil leaking up past the packing nuts will give visible indication of the clogging and allow for its remedy. This is another important feature of my invention, as in lubricators as before constructed oil leaks would be through the bottom of the unit and could not be seen to indicate a faulty feed.

Two ball checks 39, 40 are provided on the delivery side of the unit so that a partial vacuum will be created in the barrel 26 on the up stroke of the plunger 20 in case either valve fails to seat due to dirt or other foreign matter collecting between the valve and its seat. Should both valves fail to seat, the plunger 20 will fail to create a partial vacuum in the barrel and consequently no oil will flow to the barrel. The sight glass 34 will then fill, due to the operation of the plunger 19, and indicate by that condition that the valves need cleaning.

With the shaft 12 hexagonal, the cams 13 may be set on the shaft with the high and low portions of the several cams in different positions with respect to each other about the shaft and thus allow the several pump units to be operated in alternation and avoid any excess pull on the operating lever 45, as would be the case should all the cams be set on the same position. (See Fig. 15.) By being able to set the cams at different positions, the cams may be disposed so as to operate the pumps in timed relation to the operation of the engine being attended by the lubricator. When so operated, no ratchet means would be employed with the shaft 12, the latter at such time being directly connected with the desired moving part of the engine.

Figures 7, 8, 9:
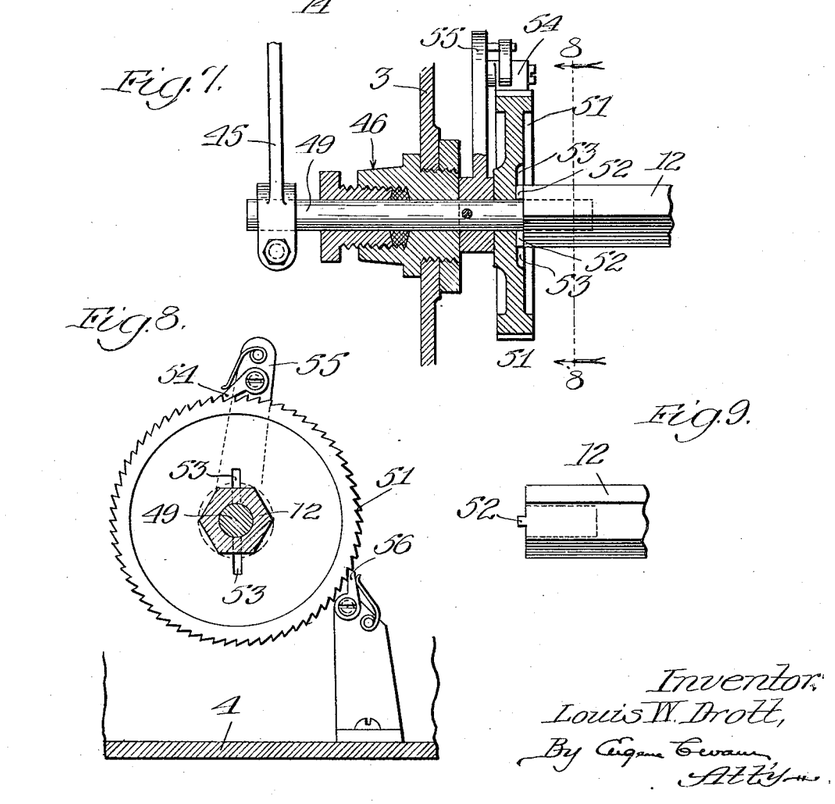
Fig. 7 is a similar sectional view through the ratchet drive at the opposite end of said shaft.
Fig. 8 is a front view of the ratchet drive taken on line 8—8 of Fig. 7.
Fig. 9 is a top plan view of the end of the cam shaft at the ratchet drive.

The shaft 12 is mounted in the reservoir 1 above the bottom wall 4 thereof in the following manner. As shown in Figs. 1, 6 and 7, the stuffing boxes 46, 47 are inserted through the end walls 3, 3 of the reservoir in line with the shaft 12. Through each box extends a cylindric shaft section 48, 49. These shafts extend into the reservoir 1 and enter recesses in the adjacent ends of the shaft 12, which terminates short of the end walls 3 of the reservoir, as shown. Shaft 12 is secured to shaft 48 by a cotter or other pin 50. Loose on shaft 49 just inside of the reservoir 1 is a ratchet wheel 51. Shaft 12 abuts against the adjacent face of this wheel in a recess made therein and has a pair of lugs or tongues 52, 52 (Figs. 7 and 9) to fit in radial slots 53, 53 made in the wheel at said recess so that the wheel when turned will rotate shaft 12. The wheel is turned through a spring controlled pawl 54 carried by an arm 55 fixed to shaft 49. A spring pressed dog 56 is mounted in the reservoir to engage the wheel 51 and prevent it from turning in the wrong direction. The operating lever 45 is secured to shaft 49 for turning the same.

Loosely and slidably mounted on the other shaft 48 exterior of the reservoir is a hand lever 57, which has a seat to engage a pin 58 on said shaft for clutching the hand lever thereto whenever it is desired to operate the plunger manually to accelerate the oil delivery or flush the parts being lubricated.

By having the shaft 12 short of the full length of the reservoir 1 and being mounted therein in the manner shown and described, the shaft 12 may be readily and easily removed from the reservoir by taking out the pin 50 and unscrewing the stuffing box 47 from the reservoir. Then the shaft 12 may be withdrawn endwise through the opening in the end wall 3 of the reservoir, its cams 13 sliding off the shaft, as is apparent. This feature is also an important one of my invention, because it provides for simplicity of construction and allows the device to be readily assembled and dismantled without the use of skilled labor.

When it is desired to rotate the shaft 12 in timed relation to the engine being lubricated, the shaft 49 is connected with the moving part of the engine in such a manner that said shaft is rotated continuously in the direction permitted by the pawl 54. At this time the shafts 12 and 49 are in effect directly connected through the pawl, etc.

It is to be observed that all of the ball checks of the unit are located remote from the plungers 19, 20 so as not to follow the same in the up strokes thereof and thus fail to seat the instant required for the efficient and accurate operation of the lubricator. Moreover, it is to be further noted that the plungers 19, 20 and the stroke shaft 15 of each unit are all slidable in the body of the unit and in addition are aligned lengthwise of the body of the unit. This makes each unit self contained with all of its parts within the margins of the flange 10. Consequently, the units, in a multiple unit lubricator, may be placed closer together than when a stroke shaft is provided for each two units and located between them as heretofore. Manifestly, more units can be assembled in a reservoir of a given size than with the units as heretofore constructed. It will be noted in Fig. 4, that the slot in the cross-head 17 at the primary plunger 19 is longer than the slot at the opposite end of the head. This is provided so that the cross-head may be slid endwise toward the primary plunger when releasing the other plunger or toward the latter plunger when engaging the same on either disconnecting or connecting the parts.

The details of construction and arrangement of parts shown and described may be variously changed and modified without departing from the spirit and scope of my invention.

I claim as my invention:

1. In a force feed lubricator, the combination with a reservoir, of a pump unit suspended therein and having pumping elements, stuffing boxes in two of the opposed walls of said reservoir, shaft sections journaled in said boxes and extending into said reservoir, a separate actuating shaft between and supported by the inner ends of said shaft sections, means whereby the actuating shaft may be turned by either of said shaft sections, a cam slidable on said actuating shaft but rotatable therewith, and means affording a driving connection from the cam to said pumping elements, said actuating shaft being slidable through the opening afforded in the reservoir on removing one of said boxes so that said actuating shaft may be inserted in and removed from said reservoir.

2. In a force feed lubricator, the combination with a reservoir, of a pump unit having a one-piece body extending across the top of the reservoir and mounted on the adjacent upright marginal walls thereof for suspending the unit in the reservoir, primary and delivery pump plungers and a stroke shaft all slidably mounted in the one-piece body and extending above the same with the plungers aligned with and on opposite sides of the stroke shaft, said shaft also extending downward through the one-piece body with its lower end in the reservoir below the body, means releasably connecting the upper ends of the plungers to the upper end of the stroke shaft whereby the shaft may operate said plungers and also may be disconnected therefrom to permit the removal of the one-piece body with its plungers from the reservoir without taking the shaft therewith, an actuating cam mounted in said reservoir below said body, and a driving connection between the lower end of the stroke shaft and the cam permitting the shaft to be readily removed from and applied to the cam after the removal of the one-piece body with its plungers from the reservoir without disturbing the mounting of the cam in the reservoir.

3. In a force feed lubricator, the combination with a reservoir, of a pump unit having a one-piece body extending across the top of the reservoir and mounted on the adjacent upright marginal walls thereof for suspending the unit in the reservoir, primary and delivery pump plungers and a stroke shaft all slidably mounted in the one-piece body and extending above the same with the plungers aligned with and on opposite sides of the stroke shaft, said shaft also extending downward through the one-piece body with the lower end of the shaft in the reservoir below the body, means releasably connecting the upper ends of the plungers with the upper end of the stroke shaft whereby the shaft may operate the plungers and also be disconnected therefrom to permit the removal of the one-piece body with its plungers from the reservoir without taking the shaft therewith, an actuating cam mounted in said reservoir below said body, and a driving yoke secured to the lower end of said stroke shaft and engaging said cam for operation thereby, said yoke having an opening through one end whereby the yoke may be readily slipped on and off the cam after the removal of the one-piece body and its plungers from the reservoir without disturbing the mounting of the latter in the reservoir.

4. In a force feed lubricator, the combination with a reservoir, of a plurality of pump units suspended in the reservoir from the upper end thereof in side by side relation, each pump unit having a body with aligned primary and delivery pump plungers and a stroke shaft all slidably mounted in the body and extending above the same, with the stroke shaft also extending downward through the body and having its lower end in the reservoir below the body, means releasably connecting the upper ends of the plungers and the stroke shaft of each unit together whereby the shaft may operate said plungers and also be disconnected therefrom to permit removal of the body and its plungers from the reservoir without taking the shaft therewith, an actuating shaft mounted in said reservoir below the bodies of the several units and common thereto, cams on said actuating shaft and having driving connections with the lower ends of the stroke shafts of the respective units for reciprocating the same, and means connecting the cams with the actuating shaft in a manner permitting adjustment of the cams to different positions about said shaft for operating the units in alternation.

5. In a force feed lubricator, the combination with a reservoir, of a plurality of pump units suspended in the reservoir from the upper end thereof in side by side relation, each pump unit having a body with aligned primary and delivery pump plungers and a stroke shaft all slidably mounted in the body and extending above the same with the stroke shaft also extending downward through the body and having its lower end in the reservoir below the body, means releasably connecting the upper ends of the plungers and the stroke shaft of each unit together whereby the shaft may operate said plungers and also be disconnected therefrom to permit removal of the body and its plungers from the reservoir without taking the shaft therewith, an actuating shaft mounted in said reservoir below the bodies of the several units and common thereto, cams on said actuating shaft and having driving connections with the lower ends of the stroke shafts of the respective units for reciprocating the same, said actuating shaft being polygonal in cross-section so that the cams may be adjusted about the shaft to different positions for actuating the units in alternation.

In testimony whereof I affix my signature this 10 day of September, 1926.

LOUIS W. DROTT.